United States Patent [19]

Isfeld

[11] Patent Number: 5,471,618
[45] Date of Patent: Nov. 28, 1995

[54] SYSTEM FOR CLASSIFYING INPUT/OUTPUT EVENTS FOR PROCESSES SERVICING THE EVENTS

[75] Inventor: Mark S. Isfeld, San Jose, Calif.

[73] Assignee: 3Com Corporation, Santa Clara, Calif.

[21] Appl. No.: 982,876

[22] Filed: Nov. 30, 1992

[51] Int. Cl.$^6$ ................................. G06F 13/26
[52] U.S. Cl. .............. 395/839; 340/825.08; 340/825.12; 364/241; 364/241.2; 364/230.2; 364/280.8; 364/DIG. 1; 395/859; 395/861; 395/826; 395/731
[58] Field of Search ................... 395/725, 325, 395/275, 800, 650; 340/825.5, 825.51, 825.08, 825.12; 370/85.6

[56] References Cited

U.S. PATENT DOCUMENTS

| | | | |
|---|---|---|---|
| 3,665,406 | 5/1972 | Gallagher et al. | 395/725 |
| 3,815,105 | 6/1974 | Adkins et al. | 395/725 |
| 3,905,025 | 9/1975 | Davis et al. | 395/725 |
| 4,038,641 | 6/1977 | Bouknecht et al. | 395/275 |
| 4,225,917 | 9/1980 | Hepworth et al. | 395/275 |
| 4,291,371 | 9/1981 | Holtey | 395/725 |
| 4,799,148 | 1/1989 | Nishioka | 395/725 |
| 4,855,997 | 8/1989 | Wilson et al. | 370/85.1 |
| 4,998,197 | 3/1991 | Kurakazu et al. | 395/800 |
| 5,012,409 | 4/1991 | Fletcher et al. | 395/650 |
| 5,083,261 | 1/1992 | Wilkie | 395/725 |
| 5,101,199 | 3/1992 | Suzuki | 340/825.08 |
| 5,247,671 | 9/1993 | Adkins et al. | 395/650 |
| 5,309,567 | 5/1994 | Mizukami | 395/325 |
| 5,408,229 | 4/1995 | Yabusaki et al. | 340/825.5 |
| 5,414,858 | 5/1995 | Hoffman et al. | 395/725 |

*Primary Examiner*—Gopal C. Ray
*Attorney, Agent, or Firm*—Haynes & Davis

[57] ABSTRACT

A mixed poll-interrupt system optimizes performance of a processor managing status information indicating the occurrence of service-requiring events generated by I/O devices. Separation logic separates the status information into a first class of more time-critical status indications and a second class of less time-critical status indications. A processor interface is connected to the separation logic and the processor, and stores data identifying status indications in the first class and data identifying status indications in the second class. The processor services the events corresponding to the status indications in the first class with a relatively higher priority routine, such as an interrupt service routine, and services the events corresponding to the status indications in the second class with a relatively lower priority routine, such as a polling routine. The separation logic also includes match logic, which matches addresses or other control information generated by the I/O device, with a prespecified match value which indicates an event having a time-critical need for service. Upon detection of a match, an indication in the first class is generated and serviced by the managing processor with an interrupt service routine.

46 Claims, 5 Drawing Sheets

SYSTEM FOR CLASSIFYING INPUT/OUTPUT EVENTS FOR PROCESSES SERVICING THE EVENTS

BACKGROUND OF THE INVENTION

1. Field of the Invention

The present invention relates to the management of status information generated by I/O devices in data processing systems; and more particularly to a combination of interrupt and polling techniques for servicing events identified by the status information.

2. Description of Related Art

Two common techniques for servicing input/output (I/O) events in a computer system include one commonly referred to as a polling technique, and one commonly referred to as an interrupt technique.

A processor using a polling technique regularly reads the status of devices that may need service. This checking is done in the normal course of execution of a control routine, and therefore may not be very responsive to events which occur asynchronously. Devices that must be serviced in a short time period may overrun their allocated resources before the processor managing the resources responds to the indication. Also, polling may use a large number of processor cycles when no operations are necessary, as the processor polls and finds nothing to do for a particular device.

Interrupts are used to solve some real time disadvantages of polling. When a device needs service, it activates an interrupt mechanism that causes the processor to execute an interrupt service routine. The interrupt service routine stops the processor in the middle of execution of a program, stores the current status information of that program, and branches to a routine to service the event signalled by the interrupt. This provides relatively fast response to devices that need system resources in a short time period, while allowing the processor to execute other tasks independent of these devices. Interrupts provide a good mechanism for notifying the processor that service is needed right away. However, if the device can continue operation without processor intervention, then interrupting causes extra cycles involved in stopping a current program, saving processor status, and executing the interrupt service routine. With heavy traffic loads, this overhead can become a significant performance penalty for a processor servicing the interrupts.

In communication switching systems, such as routers and the like, network interface devices are coupled to a plurality of asynchronous networks. A buffer memory is provided so that a given network interface device can begin receiving a packet across a corresponding network, and storing data from the packet into the buffer. Status information is posted to a processor managing the router, which then detects the destination of the packet and performs necessary routing routines on the packet. In routers using a pure interrupt system, a smaller buffer memory may be allocated for each device because of the quick response by the host. However, the wasted CPU cycles in unproductive context switching of interrupt service routines can be a significant drain on system throughput for moderate and heavily loaded systems.

Strictly polled systems in the routing environment require larger buffers for each I/O device, in order to account for worst case response by the managing CPU. However, the polled system may have greater average throughput because of less waste of CPU processing power.

It is desirable to maximize the throughput of processors servicing I/O devices, while managing the size of buffers and other resources required.

SUMMARY OF THE INVENTION

The present invention provides a mixed poll-interrupt system which optimizes performance of a processor managing I/O devices. The invention can be characterized as an apparatus for managing communication of status information from an I/O device to service routines executed by a processor. The apparatus includes separation logic which separates status information generated by the I/O devices into a first class of more time-critical status indications and a second class of less time-critical status indications. A processor interface is connected to the separation logic and the processor, and stores data identifying status indications in the first class and data identifying status indications in the second class. The processor services the status indications in the first class with a relatively higher priority routine, such as an interrupt service routine, and services the status indications in the second class with a relatively lower priority routine, such as a polling routine.

According to one aspect of the invention, the separation logic monitors interrupt signals generated on interrupt pins of I/O devices, as well as addresses or other control information generated by the I/O device. The interrupts generated on the interrupt pins of the I/O devices are normally classified as status indications in the second class, and stored in an event summary register serviced by polling. Separation logic also includes match logic, which matches addresses or other control information generated by the I/O device, with a prespecified match value which indicates a time-critical need for service by a process being executed by the I/O device. Upon detection of a match, an indication in the first class is generated and serviced with an interrupt service routine. Thus, if a particular I/O process threatens to use up its allocated system resources while waiting for the managing processor to poll the event summary register, the managing processor can be interrupted to allocate additional resources to that process.

The present invention is particularly suited to application in systems for routing packets of data amongst a plurality of communications networks which involve high throughput.

The invention can also be characterized as a method for managing status information indicating I/O events generated by I/O processes in a data processing system. The method includes the steps of storing event data in a memory coupled to a processor servicing the I/O events. The processor polls the event data to service the events in the normal course. Meanwhile, I/O processes are monitored to signal the processors of a need for time-critical service by a particular I/O process. The I/O processor is interrupted in response to an event detected in the step of monitoring which needs time-critical service.

The method can be further characterized as including the step of classifying status information into a first class of status indications identifying a need for time-critical service, and a second class of status indications for relatively lower priority events. According to this aspect, the step of monitoring includes generating an indication in the first class upon a prespecified request for system resources by a particular I/O process, and the step of interrupting is responsive to indications in the first class to cause execution of an interrupt service routine which allocates resources to satisfy the need for time-critical service.

The present invention overcomes many of the deficiencies of the prior art. For instance, the managing processor can queue up a modest number of buffers for a given I/O device, while providing more buffers in real time if needed. This minimizes the need for I/O buffers in an overall system.

Also, the I/O process monitoring based on event matching can be reprogrammed on the fly, when polling is keeping up to entirely eliminate interrupts.

Furthermore, individual devices need not be polled by the software. Rather, this information is provided to the managing processor through a processor interface which summarizes the status indications. Thus, the processor does not spend time processing idle devices nor respond to multiple indications of the same type between polling intervals.

In yet another advantage, the managing processor of the present invention does not need to interrupt for every I/O event. This results in a significant savings in CPU cycles. The round robin polling of status indications provides the highest throughputs by allowing packets to be queued up on each I/O device, and then batch processing of the queues.

Overall, a network router for very high throughput communication systems is provided that provides low average latency of packets within the buffers of the router, with moderate worse case latency. Also, system resources are used most efficiently by limiting interrupts to time-critical events and allocating resources in response to real time needs.

Other aspects and advantages of the present invention can be seen upon review of the figures, the detailed description, and the claims which follow.

DESCRIPTION OF THE PREFERRED EMBODIMENTS

Figure 1:
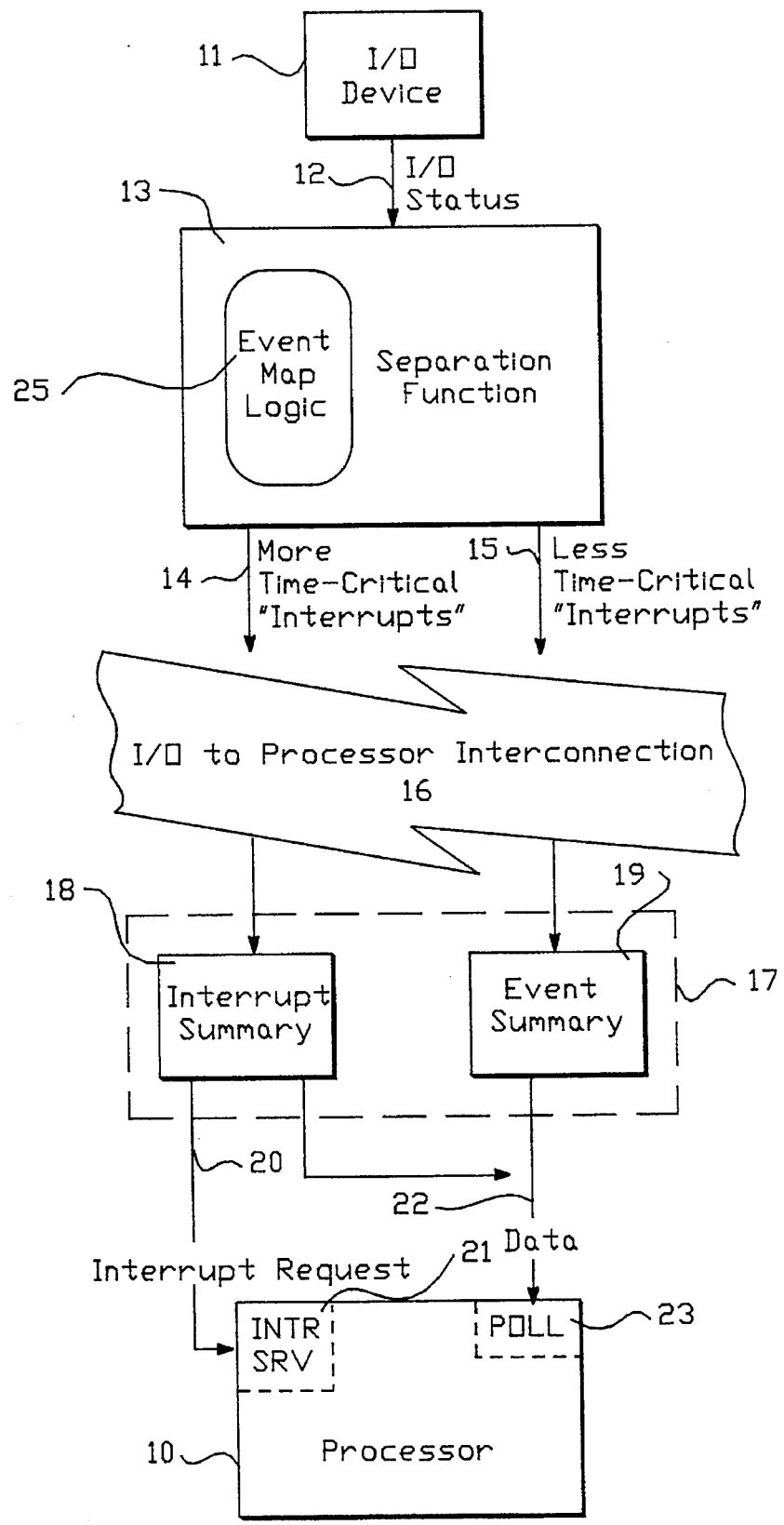
FIG. 1 is a schematic functional diagram of a system for managing status information of I/O devices according to the present invention.
Figure 2:
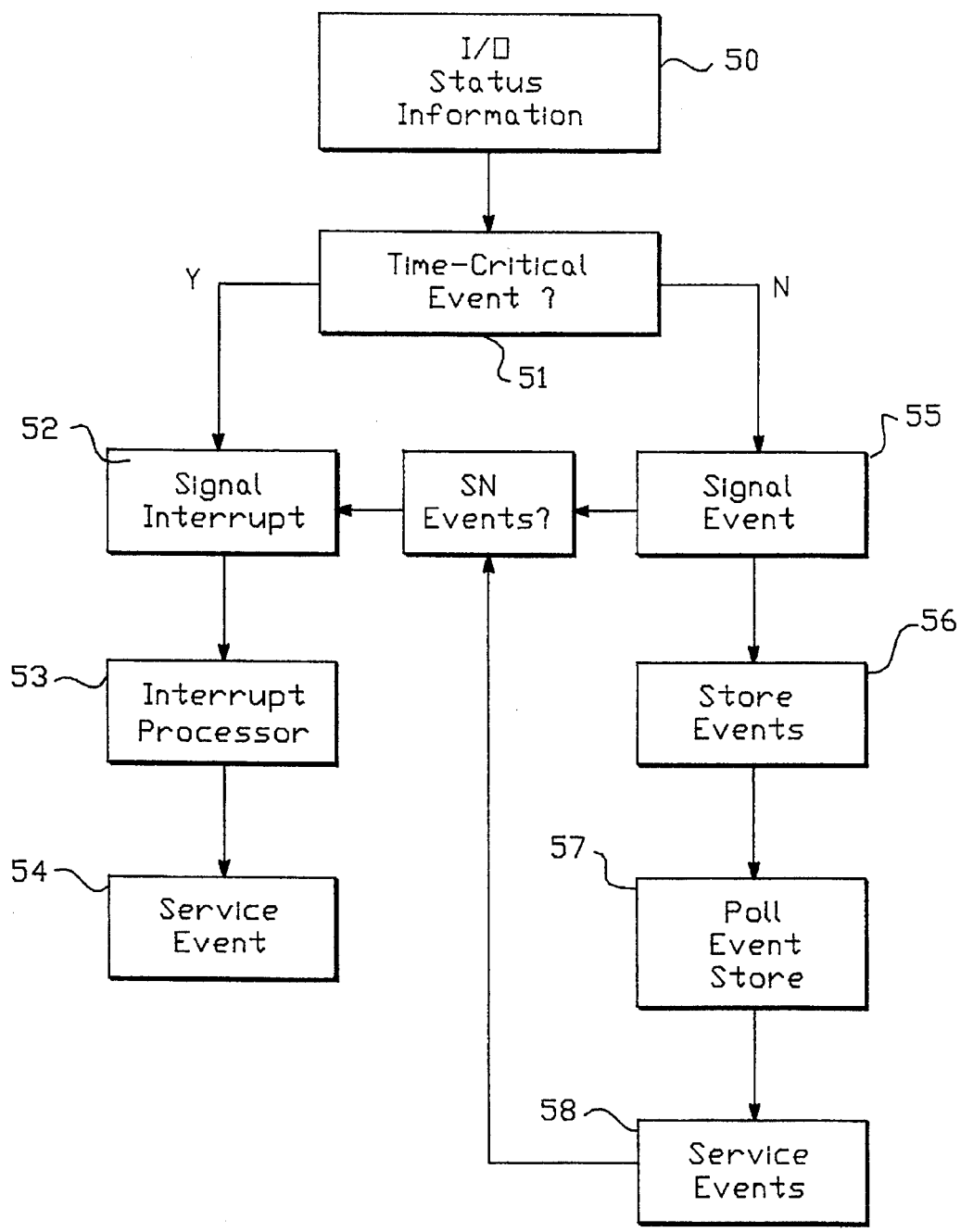
FIG. 2 is a flow chart of the mixed poll-interrupt process according to the present invention.
Figure 3:
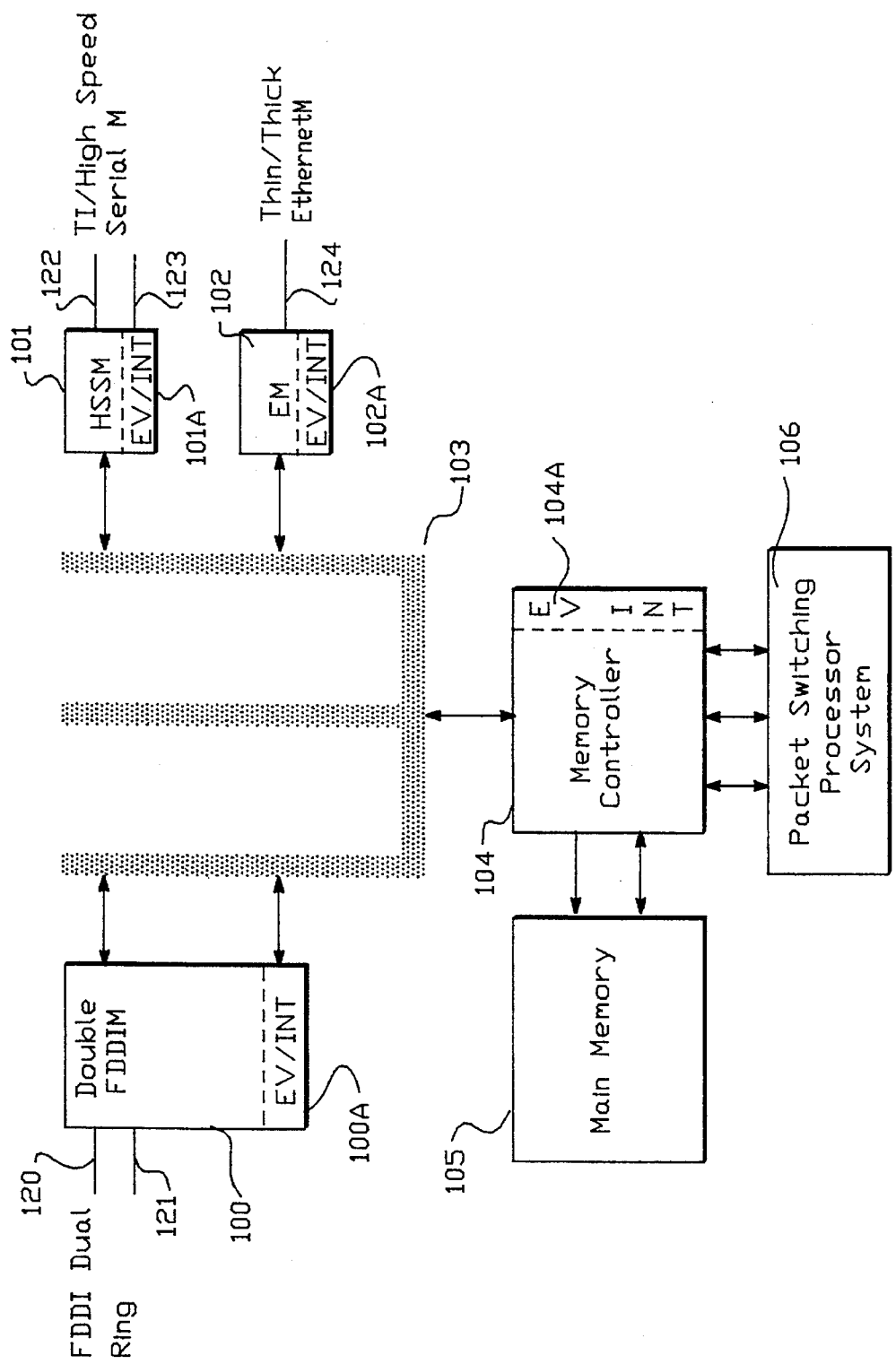
FIG. 3 is a schematic block diagram of a high throughput network router utilizing the present invention.
Figure 4:
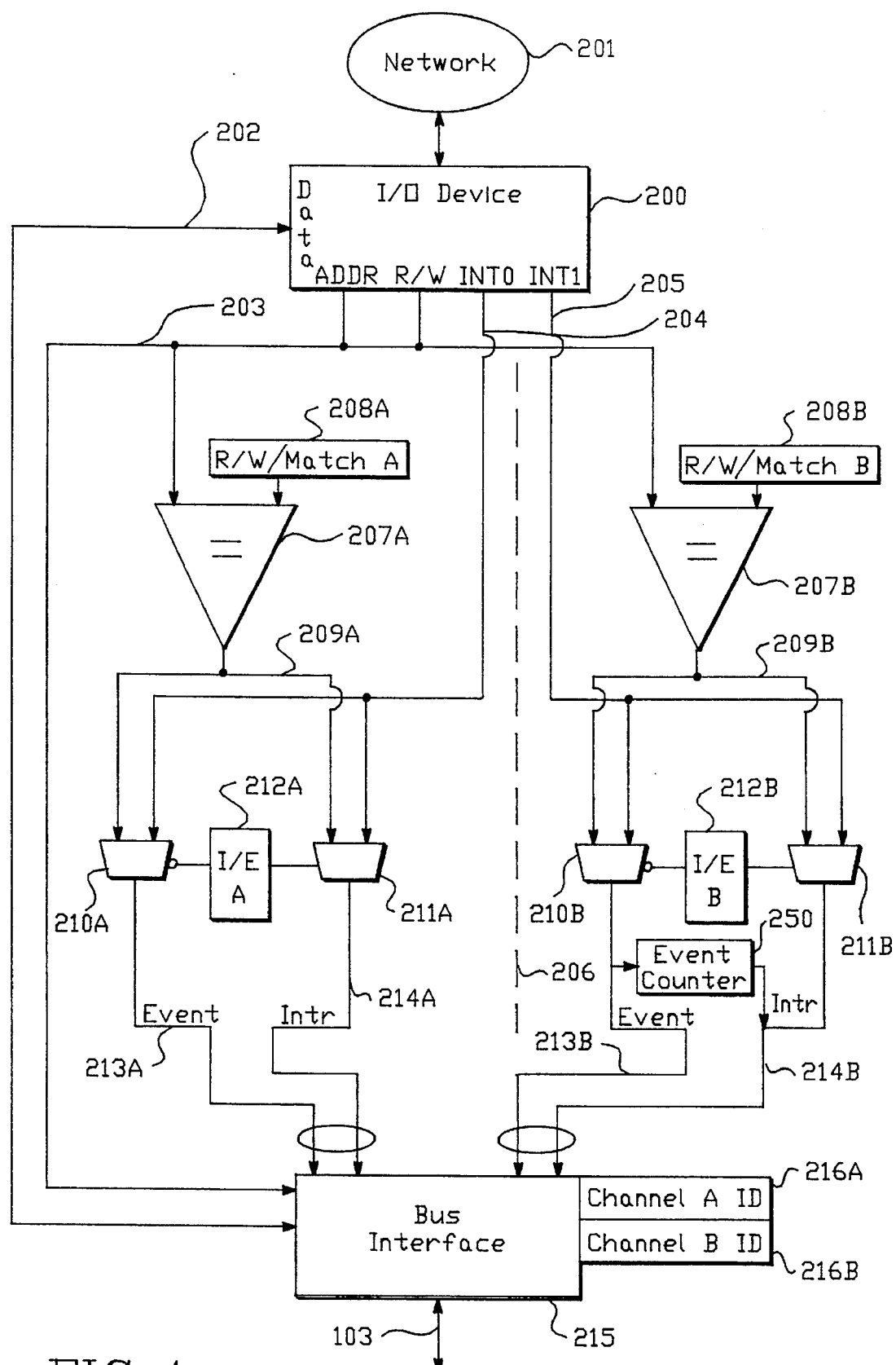
FIG. 4 is a schematic diagram of an I/O module in the system of FIG. 3, including separation logic and event match logic coupled with an I/O device.
Figure 5:
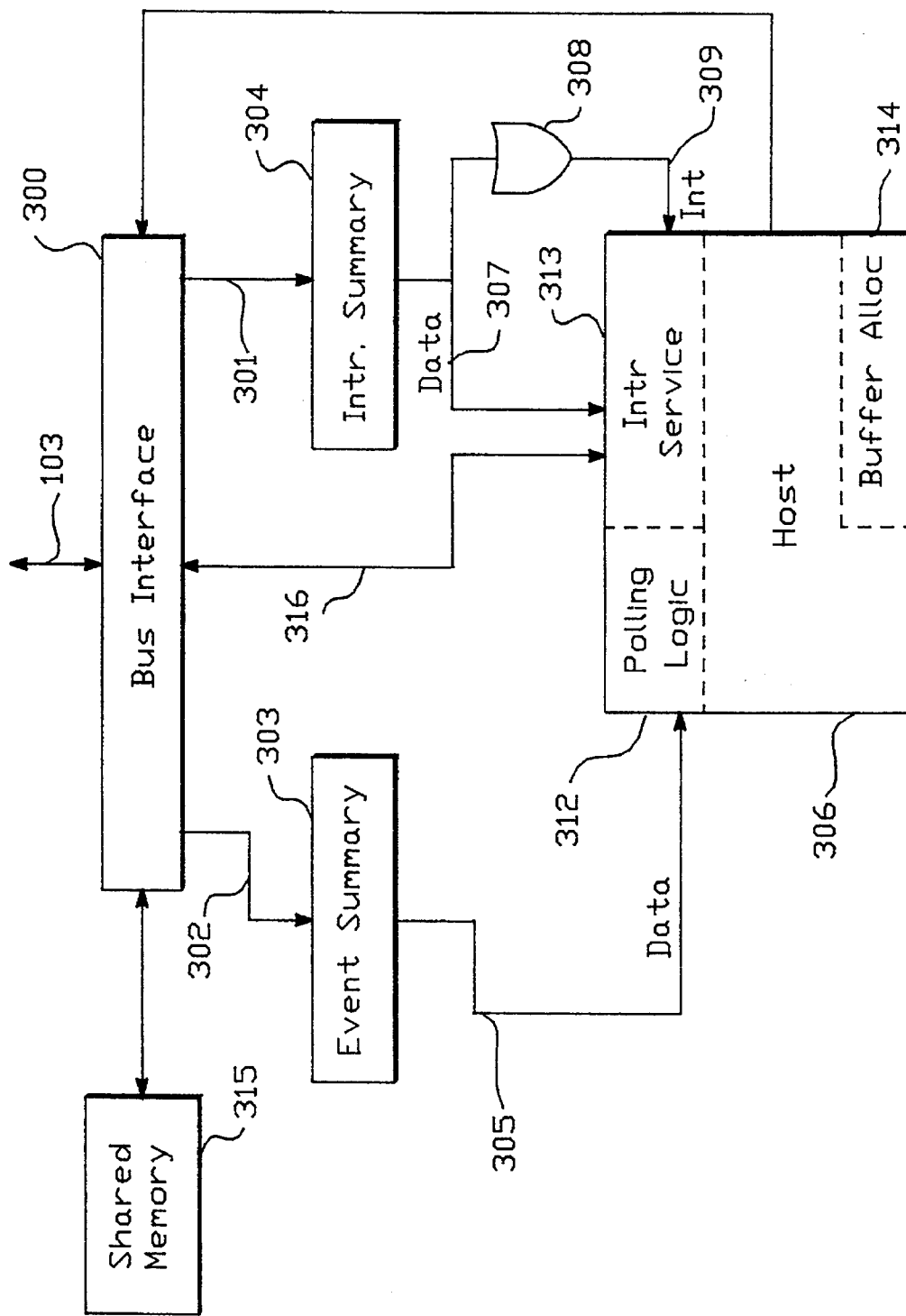
FIG. 5 is a schematic diagram of the processor interface for the status information generated by the I/O module of FIG. 4.

A detailed description of a preferred embodiment of the present invention is provided with respect to FIGS. 1–5. FIG. 1 provides a functional overview of the invention. FIG. 2 illustrates the mixed poll-interrupt process according to the present invention. FIGS. 3–5 provide an example of a preferred embodiment of the present invention.

As can be seen in FIG. 1, a data processing system is provided which includes a processor 10 which manages an I/O device 11. The I/O device 11 generates I/O status information on line 12 to indicate the occurrence of one or more varying time-critical events in the I/O device that may require servicing. The I/O status information is supplied to separation logic 13 which classifies the I/O status information into a first class of status indications of more time-critical events and a second class of status indications of less time-critical events. The more time-critical events are used to generate interrupts on line 14 and the less time-critical events are signalled on line 15. Lines 14 and 15 are supplied through an interconnection system, generally 16, to a processor interface 17 which includes an interrupt summary register 18 and an event summary register 19. The event summary register 19 stores data identifying "second class" status indications from particular I/O devices in the system. The interrupt summary register 18 stores data identifying "first class" status indications from the I/O devices in the system. Upon receipt of a first class indication signal in the interrupt summary register 18, a signal, such as an interrupt request, is generated on line 20 which is supplied to a relatively high priority service routine, such as an interrupt service routine 21, executed by the processor 10. The data in the interrupt summary register is supplied on line 22 as an input to the processor 10 and used during the service routine to identify the cause of the interrupt.

The data in the event summary register 19 is coupled to the processor 10 and serviced by a relatively lower priority routine, such as a polling routine 23, in the processor 10. The processor, during the normal course, reads the contents of the event summary register 19 to identify outstanding events indicated. The indicated events are serviced in the normal course. Also, the event summary register 19 serves to combine or filter multiple identical indications between polling intervals thereby saving host processing time by storing one bit (or other indication) indicating that at least one event has occurred for each I/O device.

As schematically illustrated in FIG. 1, the separation function includes event map logic 25 in a preferred embodiment. Event map logic is responsive to status information such as addresses or control signals generated by the I/O device to identify specific requests for system resources that may need immediate service by the processor 10. These events are mapped as more time-critical interrupts on line 14 and are serviced by the higher priority interrupt service routine 21.

For instance, the I/O device 11 may have buffer memory allocated to service processes being executed by the device. The status information on line 12 will include addresses, or offsets into the buffer memory. The event map logic may store an address which indicates that the process is nearing the limits of its allocated buffer space, either in the form of a control word address or in the form of an absolute offset into allocated buffer memory. Thus, when the I/O device generates the address indicating buffer fullness, a time-critical interrupt is generated on line 14.

In this example, the higher priority routine is an interrupt service routine, and the lower priority routine is a polling routine. The higher and lower priority routines may be both polling routines or both interrupt service routines, or other combinations and types of routines for serving the indications, as suits a particular application.

FIG. 2 is a flow chart of the poll-interrupt process according to the present invention. The system receives I/O status information from attached I/O devices (block 50). The I/O status information is separated into more time-critical and less time-critical events (block 51). For more time-critical events, an interrupt signal is generated (block 52). The interrupt signal results in interrupting the processor (block 53). The interrupted processor then services the event (block 54).

For less time-critical events, an event signal is generated (block 55). The event signals are stored in an event store (block 56). A processor polls the event store during the normal course (block 57). Upon polling of the event summary register, the events identified by the stored event signals are serviced (block 58).

Some implementations of the invention may include logic which determines whether greater than a prespecified number N of events has occurred since the last time the device being monitored was serviced. Thus, block 59 counts the events signalled in block 55, and is reset by the routine of block 58 which services the device. If the count exceeds the threshold, then an interrupt is signalled from block 52.

FIG. 3 illustrates a preferred implementation of the present invention in a router. The router system includes a plurality of network interface devices, such as a double FDDI module 100, including two interfaces 120, 121 to dual FDDI rings, a high speed serial module 101 having interfaces 122, 123 to a high speed serial link, such as a T1 line, an ethernet module 102 having an interface 124 to a thin or thick ethernet medium, and other modules not shown. All of the network interface modules 100, 101,102 are coupled to a bus system 103 providing a synchronized communication between the network interface modules to a host system. The host system includes a memory controller 104 and a main memory 105. Coupled to the memory controller 104 is the packet switching processor system 106 which controls the allocation of system resources to the network interface modules.

As shown in the figure, each of the network interface modules 100, 101, 102 includes an event-interrupt separation block 100A, 101A, and 102A, respectively, such as that described with respect to FIG. 1, as well as a network interface device providing I/O. The memory controller 104 includes an event-interrupt processor interface block 104A such as described in FIG. 1.

Multiple I/O devices pass interrupt and event requests over the bus in specially addressed bus cycles. One address space is for events, another for interrupts. All devices use the same address to address the same processor. No special wires are allocated on the system bus.

The packet switching processor system 106 may be composed of a high throughput microcomputer, such as a microcomputer based on an Am 29000 microprocessor manufactured by Advanced Micro Devices, Inc., of Sunnyvale, Calif., with associated memory storing instructions and data for use in routing packets amongst the network interface devices in the system.

The packet switching processor system 106 also allocates buffers in the main memory 105 to the network interface modules, and otherwise controls system resources used by the network interface modules. In the system of FIG. 3, the packet switching processor system 106 includes the interrupt service routines and polling routines for servicing the processor interface block 104A according to the present invention. FIGS. 4 and 5 illustrate a preferred embodiment of the present invention for use with the system of FIG. 3. FIG. 4 illustrates one of the network interface modules 100, 101, 102. FIG. 5 illustrates the event interrupt processor interface 104A in the system of FIG. 3. As can be seen in FIG. 4, each of the network interface modules includes an I/O device 200 coupled to a network 201 or other source of packets of data. The I/O device has a data interface coupled to a bus 202, an address and control interface coupled to bus 203 and interrupt pins designated INT0 on line 204 and INT1 on line 205. The bus 203 also communicates addresses, read/write signals, and other control information not shown to the bus interface 215.

The module shown in FIG. 4 includes two event-interrupt channels (designated herein channel A and channel B) separated generally by the dotted line 206. The event-interrupt channel A includes comparator 207A and match store 208A. The inputs to the comparator 207A include a subset of the information supplied on bus 203, and the output of the match store 208A. In one preferred system, the match store 208A stores a read/write indication R/W, and a match address MATCH A for channel A as described in more detail below. Upon detection of a match, the comparator 207A generates a signal on line 209A which is supplied as inputs to selectors 210A and 211A. The other inputs to selectors 210A and 211A are supplied from the interrupt INT0 on line 205. A control signal I/E for channel A is stored in store 212A. This control signal controls the selectors 210A and 211A to select either the output of comparator 207A on line 209A, or the interrupt signal INT0 on line 204 as the respective outputs. The output of selector 210A is supplied as an event signal on line 213A and the output of selector 211A is supplied as an interrupt signal on line 214A. The signals on lines 213A and 214A are combined in the bus interface 215 with an identifier for channel A which is stored in register 216A for communication across the bus 103 to the host processor.

Channel B has similar components, as indicated by reference numbers with the suffix B, except that the interrupt signal INT1 on line 205 is supplied as inputs to the selectors 210B and 211B. Also, the match store 208B, I/E control store 212B, and channel B identifier 216B are independently specified values.

Also, channel B includes event counter 250 to illustrate an additional type of status monitoring for classifying status information. Event counter 250 generates an interrupt signal on line 214B if more than a threshold number of events are signalled on line 213B between servicing of events of the I/O device 200. Of course, the event counter 250 may be used on channel A, if desired.

As can be seen, the separation logic has the ability of classifying a hard interrupt generated on an output pin of an I/O device 200, such as interrupts INT0 and INT1 on lines 204 and 205, respectively, as either an event or an interrupt. Similarly, this separation logic has the ability of classifying an event match as indicated on lines 209A and 209B as either an event or interrupt. The separation logic has a configuration register and a match register for each channel which are programmable through the host software or I/O module software specified as follows:

| Bit # | Meaning |
|---|---|
| Configuration Register | |
| 0 | Active High or Low INT input pin |
| 1 | Interrupt or Event on Int pin active |
| | 1 = Generate Interrupt on Int pin going active. |
| | 0 = Generate Event on Int pin going active. |
| 6:2 | Channel Identifier |
| | used for all Int's/Events generated by this channel. |
| 7 | Interrupt or Event on Match |
| | 1 = Generate Interrupt on EVENT MATCH indication. |
| | 0 = Generate Event on EVENT MATCH indication. |
| 8 | Match on Read or Write |
| | 1 = Allow Event Match on network controller Read cycles. |
| | 0 = Allow Event Match on network controller Write cycles. |
| Match Register | |
| 15:0 | Match Address |
| | Compare the least significant bits of all network controller memory accesses with these bits. Then |

-continued

| Bit # | Meaning |
|---|---|
| | qualify the comparison with the indication that this is a control type transfer. Also examine the programmed read or write qualifier. If it is desired to disable the Match function then this register must be loaded with an address that will never be generated by the peripheral. |

Bits 1 and 7 of the configuration register provide the I/E control value. Thus, it can be seen that alternative systems may allow independent event or interrupt selection for the interrupt pins and match signals. The match register includes 16 bits in this embodiment. Alternative systems may match over any number of signals, from a single bit to very complex combinations of status information.

The configuration data and match data from these registers may be stored in non-volatile memory, such as ROM or $E^2PROM$, during system manufacture or system set up, in alternative systems.

Thus, there are two possible stimuli in the system of FIG. 4 which can cause an event or an interrupt. The first is a hardware input going active. This will normally be connected to the interrupt output of the network interface chip 200. This input going active will cause the separation logic to generate an event or interrupt depending on the configuration register. Normally, drivers using the event/interrupt scheme will program this to generate an event. However, there may be cases where it is appropriate to generate a true interrupt.

The second stimuli that can stimulate an event or interrupt is a particular control word access or other status information by the peripheral. The programmable comparator 207A, 207B in the separation logic watches for the control word access and generates an event or interrupt in response. This is referred to as the event match function and is normally used for the purpose of signalling interrupts. This allows the driver to set the match register 208A, 208B to point, for instance, to a descriptor table entry used in the I/O process at a point which indicates a need for additional system resources. When the interface device 200 reads or writes to the specific descriptor table entry, an interrupt is generated. Thus, normal packet receive and transmit is done using events that are polled by the host processor, even in response to the hard interrupt signals generated on lines 205 and 204. If a device gets ahead of the software polling the events, and gets close to the end of the valid descriptors or other resources available, then the event match will cause a true interrupt. The interrupt routine can then allocate more buffers from the buffer pool, more processing time, or other network resources to the device so that it will not run out of resources and lose data.

Another example of status information usable for matching is a particular I/O buffer address, which may be used, for example, as a threshold to indicate buffer fullness for incoming data or buffer emptiness for outgoing data.

FIG. 5 illustrates the interface to the host processor. As can be seen, a bus interface 300 is coupled to the bus 103. The bus interface 300 receives the interrupt and event signals from the bus 103. Event signals are supplied on line 302 to event summary register 303. Interrupts are supplied on line 301 to interrupt summary register 304. The event summary register is coupled across bus 305 to the host processing system 306. The interrupt summary register 304 is coupled across bus 307 to the host processing system 306.

Also, the interrupt summary register 304 is coupled to logic 308 which generates an interrupt signal on line 309 in response to the logical OR of the contents of the interrupt summary register 304. Thus, if any interrupt has been received by the interrupt summary register 304, then an interrupt signal is generated.

The host includes polling logic 312 and interrupt service logic 313. The polling logic must clear the event summary bits before examining any device. This will avoid race conditions and the possible loss of events. When any of the bits in the interrupt summary register are set, an actual central processor interrupt is generated.

The central processor can read the event summary register at any time. However, in the normal course, events in the summary register are polled. Interrupts are summarized and forwarded to the processor as an actual interrupt. An interrupt dispatch routine reads the interrupt summary register and starts an appropriate interrupt handler software routine. Any servicing order for the polling routine can be used as suits the need of a particular application. A preferred system uses a round robin polling technique. Also, the summary registers may be enhanced in hardware using a FIFO system, or the like, to simplify host processor software. The host also includes buffer allocation logic 314 which, through line 316 and the bus interface 300, controls allocation of the shared memory 315 amongst I/O devices in the system.

In the preferred embodiment, the event summary register 303 and the interrupt summary register 304 include one bit for each event-interrupt channel in the plurality of I/O devices in the system. The location of the bit in the summary register identifies the source of the event or interrupt. The bus interface 300 is responsible for decoding the channel identifier and appropriately positioning the status indication in the respective registers. Alternative systems may store greater amounts of information in the summary registers.

The interrupt service routine 313 responds to interrupts generated on lines 309 as, for instance, a level 3 interrupt in an Am29000 based system. An interrupt dispatch routine reads the interrupt summary register and starts an appropriate interrupt handler for the device indicated.

The following table illustrates examples of how the event-interrupt channels may be configured, and the host processor respond, for modules using an MC68605 high speed serial interface device manufacture by Motorola, an ILACC ethernet interface device manufactured by Advanced Micro Devices, and a TMS380 token ring interface device manufactured by Texas Instruments. In the table, "input0" corresponds to interrupt INT0 on line 204 of FIG. 4. The term "match0" corresponds to the signal on line 209A. The term "input1" corresponds to the interrupt INT1 on line 205 of FIG. 4. The term "match1" corresponds to the signal 209B in channel B of FIG. 4. Indication Source Channel Configuration Processor Function

| Indication Source | Channel Configuration | Processor Function |
|---|---|---|
| High Speed Serial (MC68605) | | |
| Input0 | Generate Event | Process RX Pkts, TX Pkts, all indications, and errors. |
| Match0 | Int on Status write of RX Queue | Restock receive buffers |

-continued

| Indication Source | Channel Configuration | Processor Function |
|---|---|---|
| Input1 | Unused (no other int line from 68605) | |
| Match1 | Event on status read of TX Queue. | Recycle TX buffers (Free space for more TX buffer to be queued) |
| Ethernet (ILACC) | | |
| Input0 | Event on all TX pkts, or Error | recycle TX buffer(s), Handle error, clear Int. |
| Match0 | Int on TX Status write | Recycle buffers |
| Input1 | Event on all RX pkts | Process RX Pkt(s), clear Int. |
| Match1 | Int on RX status write | Restock receive buffers |
| Token Ring (TMS380) | | |
| Input0 | Event on all TX pkts, RX pkt, or error | Process RX/TX pkts, and errors and clear Int's |
| Match0 | Int on TX Status Write | Recycle Buffers |
| Input1 | Unused | |
| Match1 | Int on RX status write | Restock receive buffers |

In summary, the present invention provides an apparatus and a method for managing status information generated by I/O devices in a data processing system. All I/O status information intended to get the CPU's attention is classified as either interrupt or event. Interrupts must be serviced immediately. Events require action, but can wait. An event summary facility allows the CPU to determine which devices have events pending without having to interrogate each device. The event summary requires a minimum of one bit per device. An interrupt summary facility also requires a minimum of one bit per device. The interrupt summary causes a CPU interrupt when the interrupt summary register shows that any device has an interrupt request outstanding. The interrupt and event summary registers filter out multiple identical conditions and report only one.

In the preferred system, the separation function is coupled with the I/O device, and the event and interrupt summary function is coupled with the host processor. The I/O device in an alternative system may perform the event and interrupt summary function, or the separation function may be included in the host system. Also, particular I/O devices may integrate the separation logic function into the I/O device chip, and provide an interrupt indication and an event indication designed to be processed by a host system. The interrupt indication and event indication in such system may be provided on separate I/O pins, or otherwise.

The event-interrupt scheme of the present invention combining interrupt and polling techniques minimizes latency of data being switched in the system, limits processor overhead involved in servicing the interrupts, and allows efficient allocation of buffer memory and other system resources. It provides significant performance improvements over prior art systems, while optimizing use of system resources. Thus, a large throughput routing system can be made most efficient by transitioning between polled and interrupt driven modes of operation. Polled operations optimize host processor resources, which are supplemented with interrupts to limit worst case conditions in the system.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. In a data processing system including an input/output (I/O) device and a processor coupled to the I/O device, an apparatus for managing status information from the I/O device which indicates the occurrence of service-requiring events, comprising:

separation logic, coupled to the I/O device, which separates status information generated by the I/O device into a first class of more time-critical status indications and a second class of less time-critical status indications corresponding to events requiring service by a plurality of routines;

a processor interface, coupled to the separation logic and the processor, which stores data identifying status indications in the first class and data identifying status indications in the second class; and event servicing logic, executed by the processor and responsive to the processor interface, for servicing events with the plurality of routines including a relatively higher priority routine and a relatively lower priority routine which responds to status indications in the first class with the relatively higher priority routine to select events corresponding to the status indications in the first class for service, and responds to status indications in the second class with the relatively lower priority routine to select events corresponding to the status indications in the second class for service.

2. The apparatus of claim 1, wherein the separation logic includes:

a match store for data identifying certain status information; and means, coupled to the match store and the I/O device, for receiving the data from the match store and the status information from the I/O device, for generating an event match indication in the first class in response to a match of the status information with the data in the match store.

3. The apparatus of claim 2, wherein the status information includes control word addresses, and the data in the match store includes an address of a control word indicating a time-critical process in the I/O device.

4. The apparatus of claim 3, wherein the processor interface includes means for generating a processor interrupt in response to status indications in the first class, and the higher priority routine includes an interrupt service routine, responsive to event match indications in the first class, which allocates additional resources to the time-critical process to service events corresponding to status indications in the first class.

5. The apparatus of claim 3, wherein the higher priority routine includes a service routine, responsive to event match indications in the first class, which allocates additional resources to the time-critical process to service events corresponding to status indications in the first class.

6. The apparatus of claim 2, wherein the status information includes addresses to I/O buffers, and the data in the match store includes an I/O buffer address.

7. The apparatus of claim 6, wherein the higher priority routine includes a service routine which allocates additional resources in response to event match indications to service events corresponding to status indications in the first class.

8. The apparatus of claim 6, wherein the processor interface includes means for generating a processor interrupt in response to status indications in the first class, and the higher priority routine includes an interrupt service routine which allocates additional resources in response to event match indications to service events corresponding to status indications in the first class.

9. The apparatus of claim 1, wherein the processor interface includes means for generating a processor interrupt in response to status indications in the first class, and the higher priority routine includes an interrupt service routine to service events corresponding to status indications in the first class.

10. The apparatus of claim 9, wherein the lower priority routine includes means for polling the processor interface for data identifying status indications in the second class to service events corresponding to status indications in the second class.

11. The apparatus of claim 1, wherein the separation logic includes:

a match store for data identifying certain status information;

means, coupled to the match store and the I/O device, for receiving the data from the match store and a subset of the status information from the I/O device and for generating a match signal in response to a match of the status information with the data in the match store; and means for classifying the match signal into the first class or the second class.

12. The apparatus of claim 11, wherein the match store and means for classifying comprise programmable configuration stores.

13. The apparatus of claim 1, wherein the separation logic includes:

logic which signals an indication in the first class when greater than a prespecified number of status indications in the second class occur between services of the events corresponding to the status indications in the second class by the relatively lower priority routine.

14. The apparatus of claim 1, wherein the processor interface includes means for combining multiple status indications in at least one of the first and second classes from the I/O device.

15. The apparatus of claim 1, wherein the processor interface includes a first storage location storing a summary of status indications in the first class and a second storage location storing a summary of status indications in the second class.

16. In a communications switching system including a plurality of input/output (I/O) devices and a processor coupled to the plurality of I/O devices, an apparatus for managing status information indicating service-requiring events in the plurality of I/O devices, comprising:

classifying logic, coupled to the plurality of I/O devices, which classifies status information generated by the plurality of I/O devices into a first class of more time-critical status indications and a second class of less time-critical status indications corresponding to events requiring service by a plurality of routines;

a processor interface, coupled to the classifying logic and the processor, which stores data identifying status indications in the first class and data identifying status indications in the second class from the plurality of I/O devices; and event servicing logic, executed by the processor and responsive to the processor interface, for servicing events with the plurality of routines including a relatively higher priority routine and a relatively lower priority routine which responds to status indications in the first class with the relatively higher priority routine to select events corresponding to the status indications in the first class for service, and responds to servicing indications in the second class with the relatively lower priority routine to select events corresponding to the status indications in the second class for service.

17. The apparatus of claim 16, wherein the classifying logic includes:

a plurality of separation logic modules, coupled to respective I/O devices in the plurality of I/O devices, which separates status information generated by the respective I/O devices into status indications in the first class and status indications in the second class; and means, coupled to the plurality of separation logic modules, for communicating status indications in the first and second classes to the processor interface for the plurality of I/O devices.

18. The apparatus of claim 16, wherein the classifying logic includes:

means for storing match data identifying certain status information for respective I/O devices; and means, coupled to the means for storing, and receiving the status information from the plurality of I/O devices for generating event match indications in the first class in response to matches of match data and a subset of the status information for the respective I/O devices.

19. The apparatus of claim 18, wherein:

the means for storing includes a plurality of match data locations coupled to respective I/O devices in the plurality of I/O devices storing match data for the respective I/O devices; and the means for generating includes a plurality of comparators, coupled to respective I/O devices in the plurality of I/O devices and to a corresponding match data location in the plurality of match locations, for signalling matches of match data and a subset of the status information for the respective I/O devices.

20. The apparatus of claim 18, wherein the status information includes control word addresses, and the match data includes an address of a control word indicating a time-critical process in a corresponding I/O device.

21. The apparatus of claim 20, wherein the higher priority routine includes a service routine, responsive to event match indications in the first class, which allocates additional resources to the time-critical process to service events corresponding to status indications in the first class.

22. The apparatus of claim 20, wherein the processor interface includes means for generating a processor interrupt in response to event match indications, and the higher priority routine includes an interrupt service routine, responsive to event match indications, which allocates additional resources to the time-critical process in the corresponding I/O device to service events corresponding to status indications in the first class.

23. The apparatus of claim 18, wherein the status information includes addresses to I/O buffers of respective I/O devices, and the match data includes an I/O buffer address.

24. The apparatus of claim 23, wherein the higher priority routine includes a service routine which allocates additional resources to the respective I/O device in response to event match indications to service events corresponding to status indications in the first class.

25. The apparatus of claim 23, wherein the processor interface includes means for generating a processor interrupt in response to event match indications, and the higher priority routine includes an interrupt service routine which allocates additional resources to the respective I/O device in response to event match indications to service events corresponding to status indications in the first class.

26. The apparatus of claim 16, wherein the processor interface includes means for generating a processor interrupt in response to status indications in the first class, and the higher priority routine includes an interrupt service routine.

27. The apparatus of claim 26, wherein the lower priority routine includes means for polling the processor interface for data identifying status indications in the second class to service events corresponding to status indications in the second class.

28. The apparatus of claim 16, wherein the classifying logic includes:
   a match store for match data identifying certain status information for respective I/O devices;
   means, coupled to the match store and receiving a subset of the status information from the respective I/O devices, for generating match signals in response to a match of the match data and the subset of the status information for a respective I/O device; and
   means for classifying the match signals into the first class or the second class.

29. The apparatus of claim 28, wherein the match store and classifying logic comprise programmable configuration stores for respective I/O devices.

30. The apparatus of claim 16, wherein the classifying logic includes:
   means, coupled with the plurality of I/O devices, for signalling an indication in the first class when greater than a prespecified number of status indications in the second class occur in a particular I/O device between services by the relatively lower priority routine of the events corresponding to the status indications in the second class of the particular I/O device.

31. The apparatus of claim 16, wherein the processor interface includes means for combining multiple status indications in at least one of the first and second classes from a particular I/O device.

32. The apparatus of claim 16, wherein the processor interface includes a first storage location storing a summary of status indications in the first class and a second storage location storing a summary of status indications in the second class.

33. In a system routing packets of data among communications networks, including a plurality of network interface devices generating status information, and a processor routing data among the plurality of network interface devices and managing system resources, an apparatus for managing status information indicating service-requiring events from the plurality of network interface devices, comprising:
   a plurality of indication channels, coupled to corresponding network interface devices in the plurality of network interface devices, at least one indication channel in the plurality including
   means for classifying status information generated by the corresponding network interface devices into a first class of more time-critical events and a second class of less time-critical events for service by a plurality of routines,
   a match store for match data identifying certain status information for the corresponding network interface device,
   means, coupled to the match store and receiving a subset of the status information from the corresponding network interface device, for generating match signals in response to a match of the match data and the subset of the status information from the corresponding network interface device, and
   means for classifying the match signals into the first class or the second class;
   a processor interface, coupled to the plurality of indication channels and the processor, which stores data identifying status indications in the first class and data identifying status indications in the second class from the plurality of network interface devices; and
   event servicing logic, executed by the processor and responsive to the processor interface, for servicing events with the plurality of routines including a relatively higher priority routine and a relatively lower priority routine which responds to indications in the first class with the relatively higher priority routine to select events corresponding to the status indications in the first class for service, and responds to indications in the second class with the relatively lower priority routine to select events corresponding to the status indications in the second class for service.

34. The apparatus of claim 33, wherein:
   the match data in the match store comprises an address indicating a request for a specific system resource by the corresponding network interface device.

35. The apparatus of claim 33, wherein the processor interface includes means for generating a processor interrupt in response to status indications in the first class, and the higher priority routine includes an interrupt service routine to service events corresponding to status indications in the first class.

36. The apparatus of claim 33, wherein the lower priority routine includes means for polling the processor interface for data identifying status indications in the second class to service events corresponding to status indications in the second class.

37. The apparatus of claim 33, wherein at least two indication channels in the plurality of indication channels are coupled to a single network interface device in the plurality of network interface devices.

38. The apparatus of claim 33, wherein at least one of the plurality of indication channels coupled to a particular I/O device includes:
   means, coupled with the means for classifying, for signalling an indication in the first class when greater than a prespecified number of status indications in the second class occur between services of events corresponding to status indications in the second class of the particular I/O device by the event servicing logic.

39. The apparatus of claim 33, wherein the match store and means for classifying comprise programmable configuration stores for respective I/O devices.

40. The apparatus of claim 33, wherein the processor interface includes means for combining multiple status indications in the second class and multiple status indications in the first class from a particular indication channel.

41. The apparatus of claim 33, wherein the processor interface includes a first multi-bit storage location storing a summary of status indications in the first class for use by the relatively higher priority routine, and a second multi-bit storage location storing a summary of status indications in the second class for use by the relatively lower priority routine.

42. A method for managing status information having prespecified priority levels and identifying I/O events generated by I/O processes in a data processing system having a processor servicing the I/O events, comprising the steps of:

classifying status information into a first class of status indications for I/O events having a need for relatively more time-critical service and a second class of status indications for I/O events having a need for relatively less time-critical service;

storing event data identifying I/O events corresponding to the first and second class of status indications in a processor interface coupled to the processor;

polling the stored event data of the second class with the processor to service the I/O events corresponding to the event data of the second class in a normal course; and interrupting the processor by the processor interface in response to storing event data of the first class in the processor interface to service the I/O events corresponding to the event data of the first class.

43. The method of claim 42, further including:

generating an indication in the first class upon a prespecified request for system resources by a particular I/O process, wherein the interrupting step is responsive to indications in the first class; and allocating with an interrupt service routine additional system resources to the particular I/O process in response to the indication.

44. The method of claim 42, further including combining multiple status indications from a single I/O process in the step of storing.

45. The method of claim 42, wherein a plurality of I/O devices executes I/O processes in the data processing system, wherein the step of storing event data includes summarizing event data from the plurality of I/O devices in a single memory location accessible by the processor during the step of polling.

46. The method of claim 45, further comprising:

placing a summary of status indications of a need for time critical service from the plurality of I/O devices in a single storage location accessible by the processor during the step of interrupting.

* * * * *